United States Patent [19]
Tsai et al.

[11] Patent Number: 6,081,225
[45] Date of Patent: Jun. 27, 2000

[54] RADAR SIGNAL PROCESSING CHIP

[75] Inventors: Ming-fa Tsai, Pan-Chiao; Tai-Chung Wang, Tao-Yuan Hsien, both of Taiwan

[73] Assignee: Chung-Shan Institute of Science & Technology, Taoyuan, Taiwan

[21] Appl. No.: 09/136,852

[22] Filed: Aug. 19, 1998

[30] Foreign Application Priority Data

May 15, 1998 [TW] Taiwan ................................. 87107570

[51] Int. Cl.[7] ............................. G01S 13/00; G01S 13/50; G01S 7/292
[52] U.S. Cl. ............................ 342/195; 342/175; 342/89; 342/91; 342/93
[58] Field of Search ....................................... 342/175, 195, 342/25, 378, 379, 380, 381, 382, 383, 384, 89–93; 395/800.01, 800.1, 800.16, 800.17, 800.18, 800.19, 800.32, 800.34, 800.35; 708/507, 508, 509, 521, 522, 524

[56] References Cited

U.S. PATENT DOCUMENTS

| | | | |
|---|---|---|---|
| 3,875,391 | 4/1975 | Shapiro et al. | 342/195 X |
| 4,575,724 | 3/1986 | Wiener | 342/383 |
| 4,866,448 | 9/1989 | Roca et al. | 342/25 |
| 5,448,245 | 9/1995 | Takase | 342/195 |
| 5,572,215 | 11/1996 | Evans et al. | 342/195 |
| 5,875,463 | 2/1999 | Crump et al. | 395/800.01 X |

Primary Examiner—Bernarr E. Gregory
Attorney, Agent, or Firm—Thomas, Kayden, Horstemeyer & Risley

[57] ABSTRACT

A radar signal processing (RSP) chip is used to process massive radar signals. The RSP chip includes a multiply and accumulate (MAC) array and a programmable delayer. The programmable delayer provides a concurrence alignment of the radar signals. The MAC array includes several MAC units. Each MAC unit can be set to either a parallel operation mode or a pipeline operation mode. Moreover, the RSP chip also includes a reference code generator, which further includes a look-up table circuit to store a data table for fast computation uses. A control unit is also included in the RSP chip for producing several control signals to control the operations. The RSP chips can be fabricated using VLSI technology and can be serially coupled one after another.

20 Claims, 16 Drawing Sheets

RADAR SIGNAL PROCESSING CHIP

CROSS-REFERENCE TO RELATED APPLICATION

This application claims the priority benefit of Taiwan application Ser. No. 87107570, filed May 15, 1998.

BACKGROUND OF THE INVENTION

1. Field of the Invention

This invention relates to a signal processor, and more particularly to a radar signal processing (RSP) chip used for processing a radar signal.

2. Description of Related Art

Most of digital signal processing (DSP) chips are designed to have ability to process signals like a usual microprocessor but have a faster computation speed of multiply and accumulate (MAC) operation. However, this kind of DSP chip has only one MAC processing unit so that it cannot effectively process a vector operation.

Because the semiconductor fabrication technologies have been greatly improved in recent years, a very large-scale integrated circuit (VLSI) fabrication is well developed. This makes it be possible that a single chip can include a MAC array for vector signal processing. The invention bases on the VLSI technology to design a radar signal processing chip, which includes a MAC array composed of several MAC units and thereby can effectively perform vector operations in parallel mode or pipeline mode. The radar signal processing (RSP) chip further includes a programmable delay line for real time data flow control. Moreover the RSP chip can be cascade for larger vector operations than a single chip can provide.

SUMMARY OF THE INVENTION

It is therefore an objective of the present invention to provide a RSP chip including a MAC array and a programmable delay line. The MAC units in the MAC array can operate in parallel mode or pipeline mode and there is a look-up table producing reference data for each MAC unit. The MAC array is suitable for most radar signal operations such as pulse compression, pulse Doppler processing (PDP), moving-target indication (MTI), digital video integration (DVI), and constant false alarm rate detection (CFAR).

It is another objective of the present invention to provide a fabrication method for a RSP chip by using the VLSI fabrication technology, in which a MAC array is included in a single RSP chip so that it can effectively process vector operations for radar signals.

In accordance with the foregoing and other objectives of the present invention, a RSP chip has a data input channel, a reference input channel, and a cascade input channel, and has a data output channel and a reference output channel. The RSP chip includes a reference code generator, a MAC array, a programmable delay line, an input select multiplexer, an output select multiplexer, an arithmetic and logical unit (ALU). Moreover, in order to have more functions, the RSP chip can further include a control unit, and an output processing unit.

The reference code passes through the reference code generator from the reference data input channel to the reference output channel. The programmable delay line can align these data passing through the data input channel and the cascade input channel. The input select multiplexer selects one of the data channels from the data input channel, the cascade input channel and a feedback channel as an input signal to the MAC array. The MAC array receives the data input channels from the input select multiplexer and the reference code from the reference code generator. After parallel or pipeline arithmetic computations, the MAC array transmits the computation result through either the first or the second output port to the output select multiplexer. The output select multiplexer also receives the multiplexer signal and transmits an output multiplexer signal to the ALU. The ALU also receives a delay signal from the programmable delay line and output an arithmetic output which is sent to the output processing unit and sent to input select multiplexer as the feedback input. The output processing unit transmits the data output.

In the foregoing, the output processing unit includes a scale circuit and a data formation circuit. The scale circuit scales down results of the ALU. The data formation circuit further converts the result into a floating point format and transmits it, which is the data out output of the RSP chip.

The reference code generator (RCG) is composed of a RCG unit for each MAC unit. All the RCG units are serially coupled together through their reference inputs and reference transmits. Each RCG unit is sequentially set up via reference input and generates reference data for each MAC units. Each RCG unit includes a reference latch, a look-up table circuit, and a reference select multiplexer. The reference latch keeps the internal reference input or passes it to the internal reference output. The look-up table circuit is set up by the reference latch and generates a reference table to the reference select multiplexer. The reference select multiplexer chooses data from the reference latch directly from the reference input or the look-up table. Furthermore the reference select multiplexer externally receives a mask control signal and a reference select strobe.

The MAC array is composed of a number of MAC units. Each MAC unit receives the internal reference value, two internal cascade input signal CIN__1 and CIN__2, and transmits two cascade output signal COUT__1 and COUT__2. All the MAC units are serially coupled together through two internal cascade input lines, and two internal cascade output lines. Both the cascade input lines of the first MAC unit receive a constant zero. Both of the cascade output lines of the last MAC unit are the computation results of the MAC array.

Each MAC unit includes a reference input latch, a multiplier, an adder, a cascade select multiplexer, an accumulation latch, a download select multiplexer, and a download latch. The reference input latch receives the internal reference value and transmits an output to the multiplier. The multiplier receives this output and a data input and transmits an output to the adder. The adder receives this output and an output from the cascade select multiplexer and transmits an output to the accumulation latch. The accumulation latch receives the output from the adder and transmits the first internal cascade output, which is also transmitted to the download select multiplexer and is feedback to the cascade select multiplexer. The cascade select multiplexer receives the first internal cascade output and the first internal cascade input and transmits the output to the adder. The download select multiplexer receives the first internal cascade output from the accumulation latch and the second internal cascade input and transmits an output to the download latch. The download latch receives this output from the download select multiplexer and transmits the second internal cascade output. Moreover, the cascade select multiplexer also receives a mode control strobe to determine that the input signal on the cascade select multiplexer is one of the first internal cascade input or the first internal cascade output. The accumulation latch further receives a clear strobe to set the latched value to be zero. The download select multiplexer further receives a download control strobe to determine that the input signal is one of the second internal cascade input or the first internal cascade output.

The reference code generator has the same number of units as the MAC array, in which the units are paired and indexed with a same index number.

The programmable delay line includes a number of delay latches a delay input multiplexer, a programmable delay unit, and a delay output multiplexer. The delay latches are serially coupled together but the first delay latch externally receives the cascade input. Each output of the delay latches is inputted to the delay input multiplexer, which transmits an internal delay input signal to the programmable delay unit and the delay output multiplexer. The delay output multiplexer receives the internal delay input signal and an output of the programmable delay unit and transmits the delay signal.

The control unit receives an external command and then transmits a number of mask signals and a number of control signals. The control unit includes a first-in-first-out (FIFO) buffer, a command register, a mask decoder, and a command decoder. The FIFO buffer receives the external command and transmits an internal command to the command register. Several internal commands are registered in the command register through several command latches. The command latches are serially coupled together. The first command latch receives the inter command and the last command latch transmits the internal command to the mask decoder to decode into the mask signals. Each of the mask signals is inputted to the reference select multiplexer as the mask control signal. The mask control signal can mask the reference select multiplexer output in the RCG unit when the signal is at enabling voltage level. This can determine the used number of the reference code.

The command decoder receives all the internal commands in the command register and decodes the internal commands into a number of control strobes. The control strobes include an input select strobe, an output select strobe, the reference select strobe, the mode control strobe a delay input control strobe, a delay presetting strobe a delay output control strobe. Moreover, the clear strobe and the download control strobe are also included for dynamic control.

The input select strobe controls the input select multiplexer to determine that the input of the input select multiplexer is one of the data input the cascade input or the feedback input. The output select strobe controls the output select multiplexer to determine that the input of the output select multiplexer is one of the computation results or the output of the input select multiplexer. The reference select strobe controls the reference select multiplexer to determine that its input is one of the internal reference output or the table output. The delay input control strobe controls the delay input multiplexer to determine which one of the delay latches to be the input of the delay input multiplexer. The delay presetting strobe controls the programmable delay unit to determine its delay time. The delay output control strobe controls the delay output multiplexer to determine that the input is one of the internal delay input signal or the output of the programmable delay unit.

BRIEF DESCRIPTION OF DRAWINGS

The invention can be more fully understood by reading the following detailed description of the preferred embodiment, with reference made to the accompanying drawings as follows.

DETAILED DESCRIPTION OF PREFERRED EMBODIMENT

Figure 1:
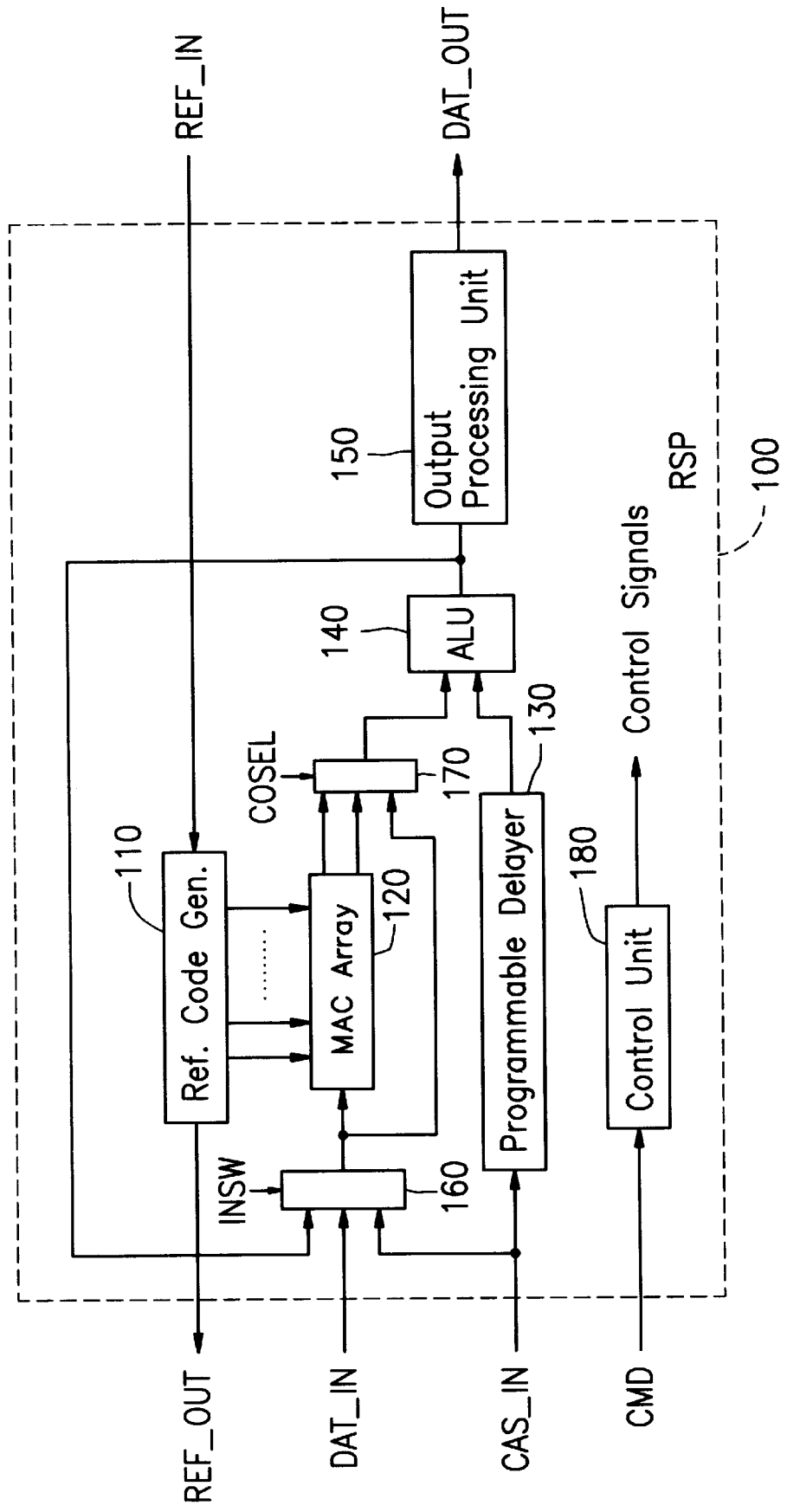
FIG. 1 is a block diagram schematically illustrating, a RSP chip, according to a preferred embodiment of the invention.

FIG. 1 is a block diagram schematically illustrating a RSP chip, according to a preferred embodiment of the invention.

A RSP chip 100 can receive a data input DAT_IN, a reference data input REF_IN, and a cascade input CAS_IN. The RSP chip 100 can also transmit a data output DAT_OUT and a reference output REF_OUT. The RSP chip preferably includes a reference code generator (RCG) 110 a MAC array 120, a programmable delay line 130, an arithmetic and logical unit (ALU) 140, an input select multiplexer 160 and an output select multiplexer 170. Moreover, the RSP chip can further include a control unit 180 and an output processing unit 150 to obtain a more complete function.

The input select multiplexer 160 including three inputs can receive the reference data input DAT_IN, a cascade input CAS_IN, and a feedback from the ALU 140. The input select multiplexer 160 also selects one signal as an input to the MAC array 120 by the select strobe INSW. The MAC array 120 receives an input from the input select multiplexer 160 and the reference code data vector from the RCG 110. Then, after computation, the MAC array 120 transmits a computation result from either COUT_1 or COUT_2 port to an output select multiplexer 170. The output select multiplexer 170 includes three inputs to receive these two computation output ports COUT_1 and COUT_2 from the MAC array 120 and the input signal directly from the input select multiplexer 160. The output select multiplexer 170 transmits an output signal to the ALU 140. An output select strobe COSEL, controls the output select multiplexer 170 to transmit one of its three inputs to its Output port. The ALU 140 receives this output from the output select multiplexer 170 and an output signal from the programmable delayer 130. The programmable delayer 130 can delay the cascade input CAS_IN for a certain time clock and then transmits the delay signal. The ALU 140 can perform arithmetic computations on its inputs from the output select multiplexer 170 and the programmable delayer 130 and then transmit its output to the output processing unit 150 and feedback to the input select multiplexer 160. After scale and formation processes, the output processing unit 150 transmits its result to its output port DAT_OUT. The RSP chip 100 can receive control commands from a CMD port through the control unit 180, which decodes the control commands into various types of control signals to control the operations of the RSP chip 100.

A function of the RCG 110 is to provide the reference codes such as pulse Doppler processing (PDP) coefficient data or pulse compression reference data. The RCG 110 receives the reference data from REF_IN port, generates the reference code vector for the MAC array 120, and sequentially passes the input to the reference output port REF_OUT. The reference code vector is sent to the MAC array 120. The RCG 110 includes a number of RCG units 200 shown in FIG. 2, which is a block diagram schematically illustrating the RCG unit of the RSP chip. Each of the RCG units 200 includes a reference latch 210, a look-up table 220, and a reference select multiplexer 230. Each RCG unit 200 receives an internal reference input RIN through the reference latch 210 and then transmits an internal reference output ROUT from the reference latch 210 and an internal reference value R_VAL. The reference code vector of the RCG 110 is composed of these internal reference values R_VAL from the RCG units 200. Each internal reference value R_VAL is selected by the reference select multiplexer 230 from either the reference latch 210 Or the look-up table circuit 220.

Moreover, each RCG unit 200 is serially coupled to each other through the internal reference input RIN and the internal reference output ROUT but the first RCG unit 200 receives the reference input REF_IN and the last RCG unit 200 transmits the reference output REF_OUT. The reference latch 210 latches the internal reference input RIN and transmits to the internal reference output ROUT. The look-up table circuit 220 includes an address generator and a memory table (not shown) to generate reference data for MAC units 300. For example, the pulse Doppler processing needs many sine and cosine values for different phases and amplitudes. A standard sine and cosine function table are stored in the look-up table circuit 220. In each time of arithmetic computations, the needed quantities of the sine or cosine functions can be obtained from the look-up table circuit 220 by simply giving proper address without full computing on the sine or cosine functions. The reference select multiplexer 230 controlled by a reference select strobe R_SEL such that it can select the input from either the internal reference latch 210 or the look-up table circuit 220.

The arithmetic operations mainly include a multiplication operation and an accumulation operation. They are done in the MAC array 120. The array structure makes the vector signal processing be possible. The MAC array 120 as described above can receive the output of the input select multiplexer 160 and the reference code vector from the RCG 110 and then transmit the computation result to the output select multiplexer 170. The MAC array 120 includes a number of MAC units 300 as shown in FIG. 3, which is a block diagram schematically illustrating the MAC unit of the RSP chip.

Figure 2:
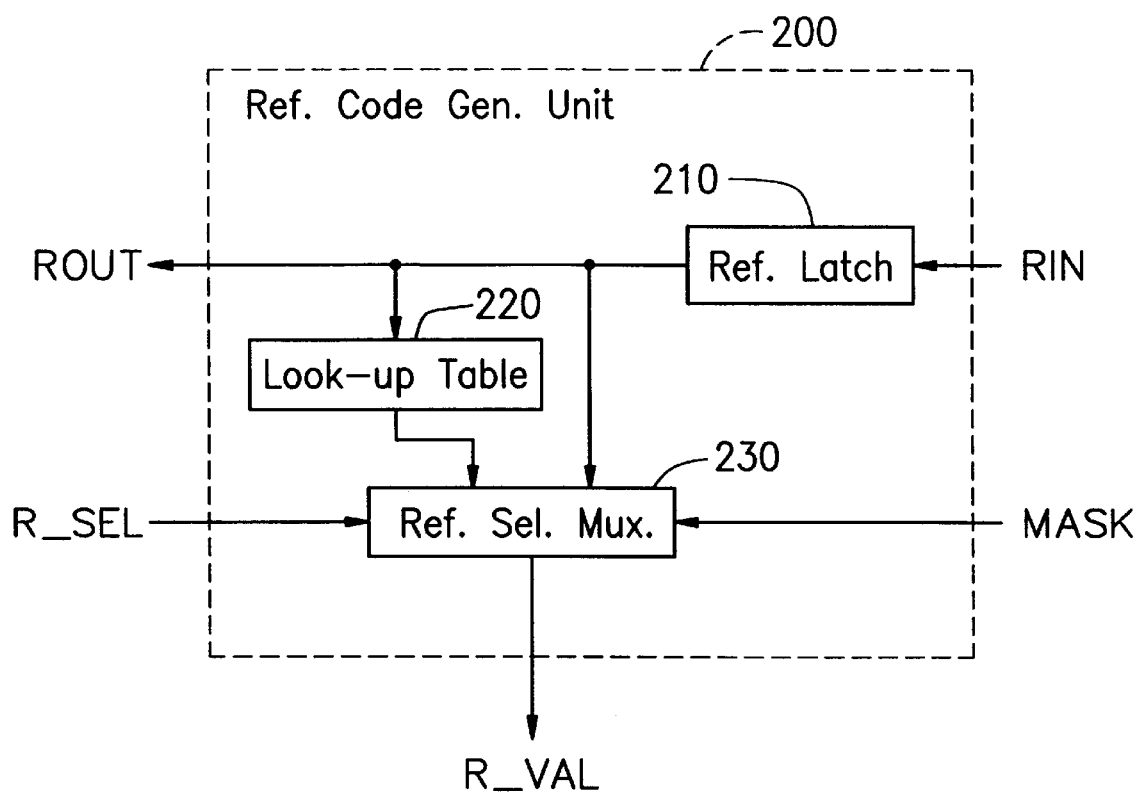
FIG. 2 is a block diagram schematically illustrating the reference code generator unit of the RSP chip.
Figure 3:
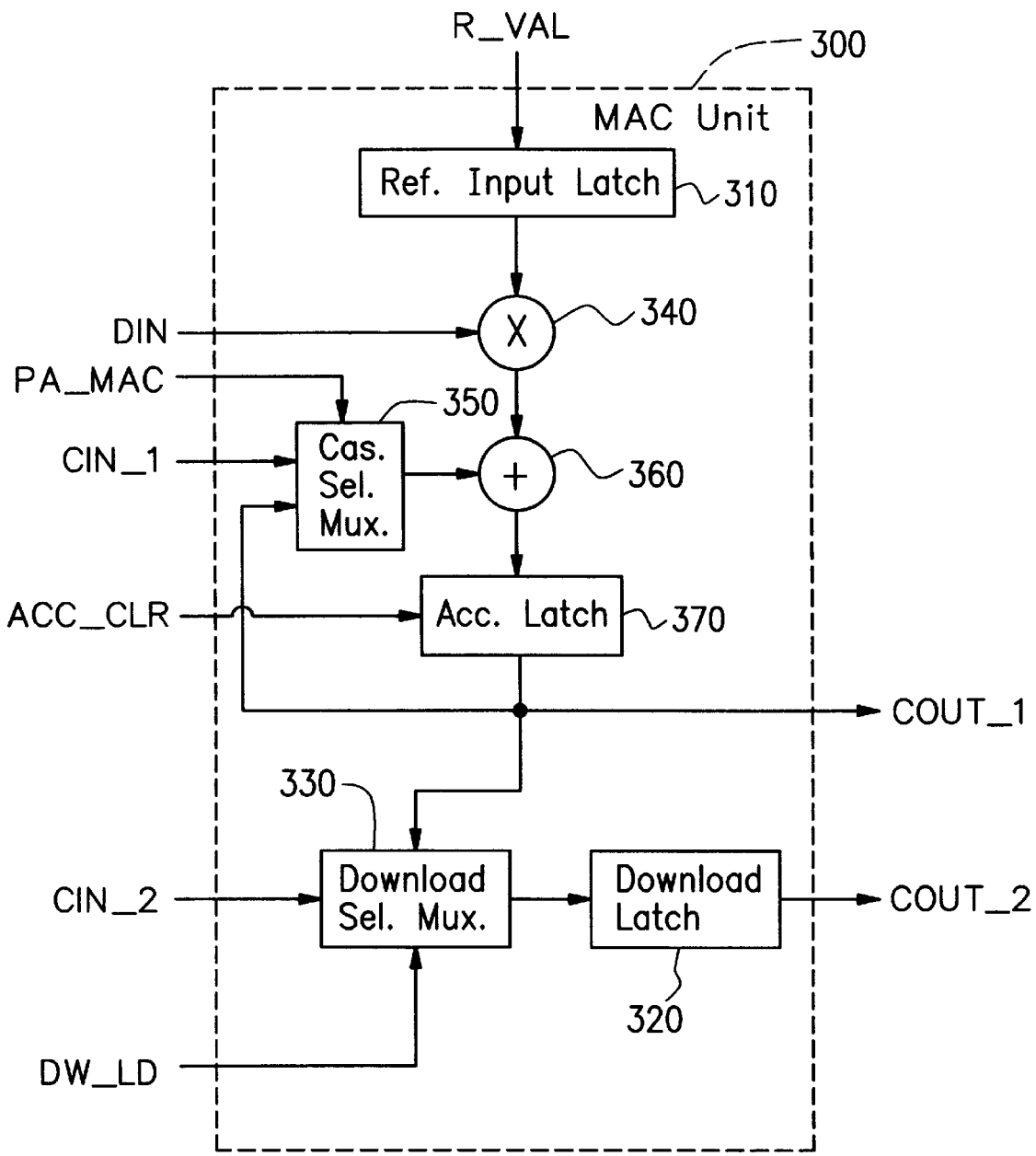
FIG. 3 is a block diagram schematically illustrating the MAC unit of the RSP chip.

In FIG. 3, each MAC unit 300 is corresponding to one RCG unit 200, shown in FIG. 2 through its internal reference value R_VAL. Each MAC unit 300 receives the internal reference value R_VAL and the input select multiplexer 160 output DIN, an internal cascade input CIN_1, and an internal cascade input CIN_2. Each MAC unit 300 also transmits an internal cascade output COUT_1 and an internal cascade output COUT_2. All the MAC units 300 are serially coupled together through the inputs CIN_1, CIN_2 and the transmits COUT_1, COUT_2 of each MAC unit 300 to form the MAC array 300. This is done by connecting, the previous output COUT_1 to the current input CIN_1 and connecting the current output COUT_1 to the next input CIN_1, and connecting the previous output COUT_2 to the current input CIN_2 and connecting, the current output COUT_2 to the next input CIN_2. The CIN_1 and the CIN_2 of the first MAC unit 300 receive a zero constant. The COUT_1 and the COUT_2 of the last MAC unit 300 are the two computation output ports connected to the output select multiplexer 170.

Each MAC unit 300 includes a reference input latch 310 a multiplier 340, an adder 360, a cascade select multiplexer 350, an accumulation latch 370, a download select multiplexer 330, and a download latch 320. The reference input latch 310 receives the corresponding reference value R_VAL. The multiplier 340 receives the output of the reference input latch 310 and the output DIN of the input select multiplexer 160 and transmits an output to the adder 360. The adder 360 receives the output of the multiplier 340 and an output of the cascade select multiplexer 350 and transmits its result to the accumulation latch 370. The accumulation latch 370 receives the output of the adder 360 and transmits the internal cascade output COUT_1 to the download select multiplexer 330 or the cascade select multiplexer 350 as a feedback input. The cascade select multiplexer 350 receives the feedback input and the internal cascade input CIN_1 and transmits the output to the adder 360. The cascade select multiplexer 350 is also controlled by a mode control strobe PA_MAC to determine either the CIN_1 or the feedback input to be sent to the adder 360. The output of the cascade select multiplexer 350 determines that the MAC unit 300 is at a parallel computation mode or a pipeline computation mode. If the feedback input is selected then each MAC unit 300 performs a parallel computation and accumulates all computation results into the accumulation latch 370. If the mode control strobe PA_MAC selects the CIN_1 as the input to the adder 360, then the MAC unit 300 is at the pipeline computation mode. In this pipeline mode, the MAC unit 300 accumulates the computation results from the previous MAC unit 300. This operation style is called the systolic array operation. A clear strobe ACC_CLR resets the stored value in the accumulation latch 370 to be zero before each time of computations. All MAC units 300 are reset simultaneously.

The download select multiplexer 330 includes two inputs to receive the output of the accumulation latch 370 or the internal cascade input CIN_2. The download select multiplexer 330 also transmits an output to the download latch 320. A download control strobe DW_LD simultaneously controls all download select multiplexer 330 in each MAC unit 300. The output of the accumulation latch 370 is first downloaded to the download latch 320 and then secondly the internal cascade input CIN_2 is downloaded to the download latch 320. So, both the MAC arithmetic computation and the shifting out of results are concurrently performed.

Figure 4:
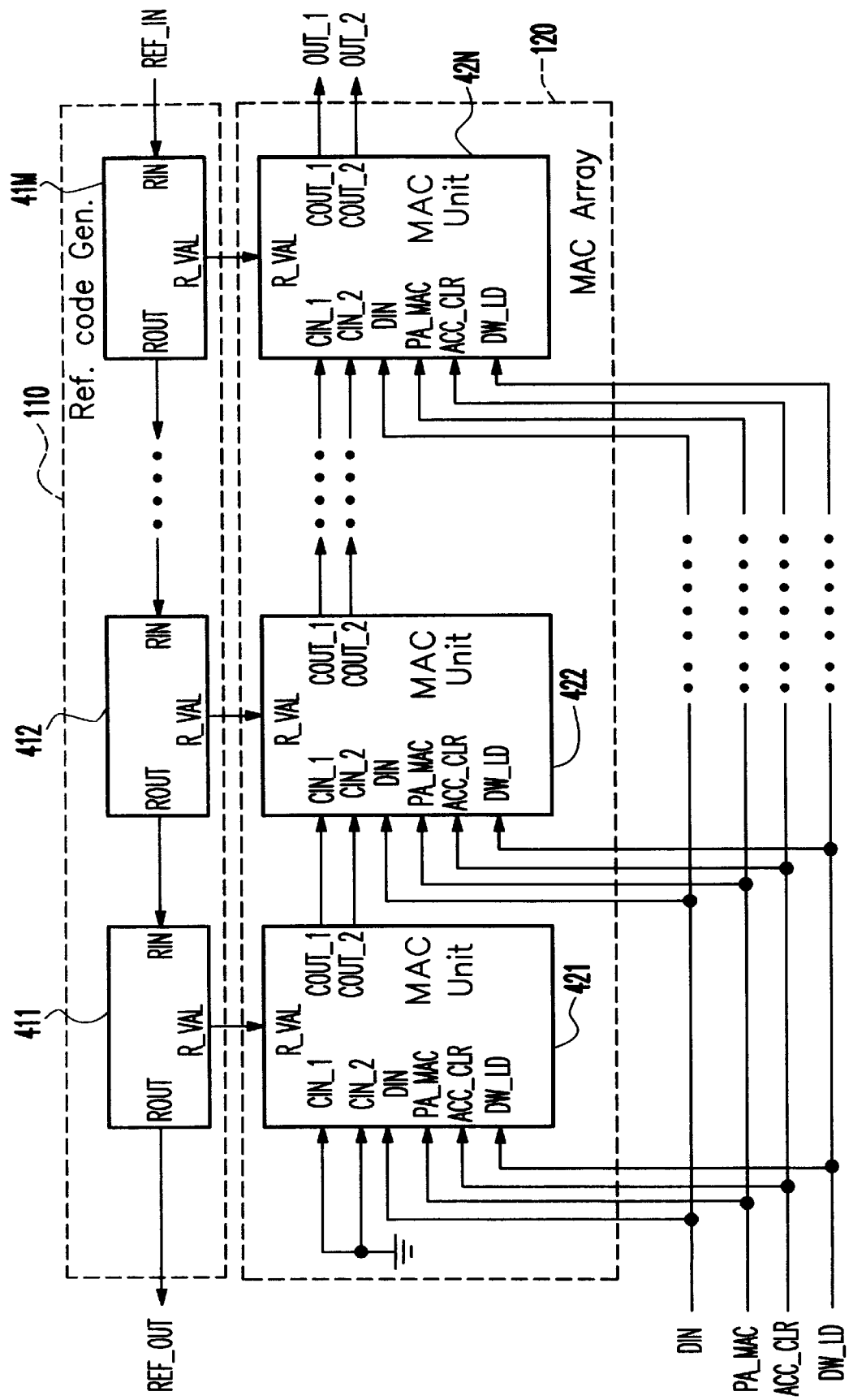
FIG. 4 is a block diagram schematically illustrating the MAC array of the RSP chip.

FIG. 4 is a block diagram schematically illustrating the MAC array of the RSP chip. In FIG. 1 through FIG. 4, the RCG array 110 and the MAC array 120 have the same number of units, which are paired through the internal reference value R_VAL. Each pair is indexed by "i", where "i" is from 1 to N. A block 41i simply represents one RCG unit 200 as show in FIG. 2, and a block 42i simply represents one MAC unit 300 as shown in FIG. 3. For example, the block 411 is coupled with the block 421 through its individual internal reference value R_VAL. All the blocks 41i are serially coupled together through the internal reference input RIN and the internal reference output ROUT The ROUT of the block 411 is the reference output REF_OUT, and the RIN of the block 41N is the reference input REF_IN. All the blocks 42i are serially coupled together through the CIN_1, and CIN_2 with the COUT_1 and COUT_2. The CIN_1 and the CIN_2 of the block 421 are grounded. The COUT_1 and the COUT_2 are the computation results of OUT_1 and OUT_2. The input select multiplexer 160 output DIN is simultaneously broadcasted to all blocks 42i of the MAC units 300. The mode control strobe PA_MAC controls the operation mode as either a parallel computation mode or a pipeline computation mode. The reference select multiplexer 230 in the RCG unit 200 also receives a mask signal. When the mask signal is at enabling voltage state, all transmits of the reference select multiplexer 230 are constant such as a zero constant, which causes each output of the multiplier 340 in the MAC unit 300 to be zero and thereby inhibits the MAC units 300.

Figure 5:
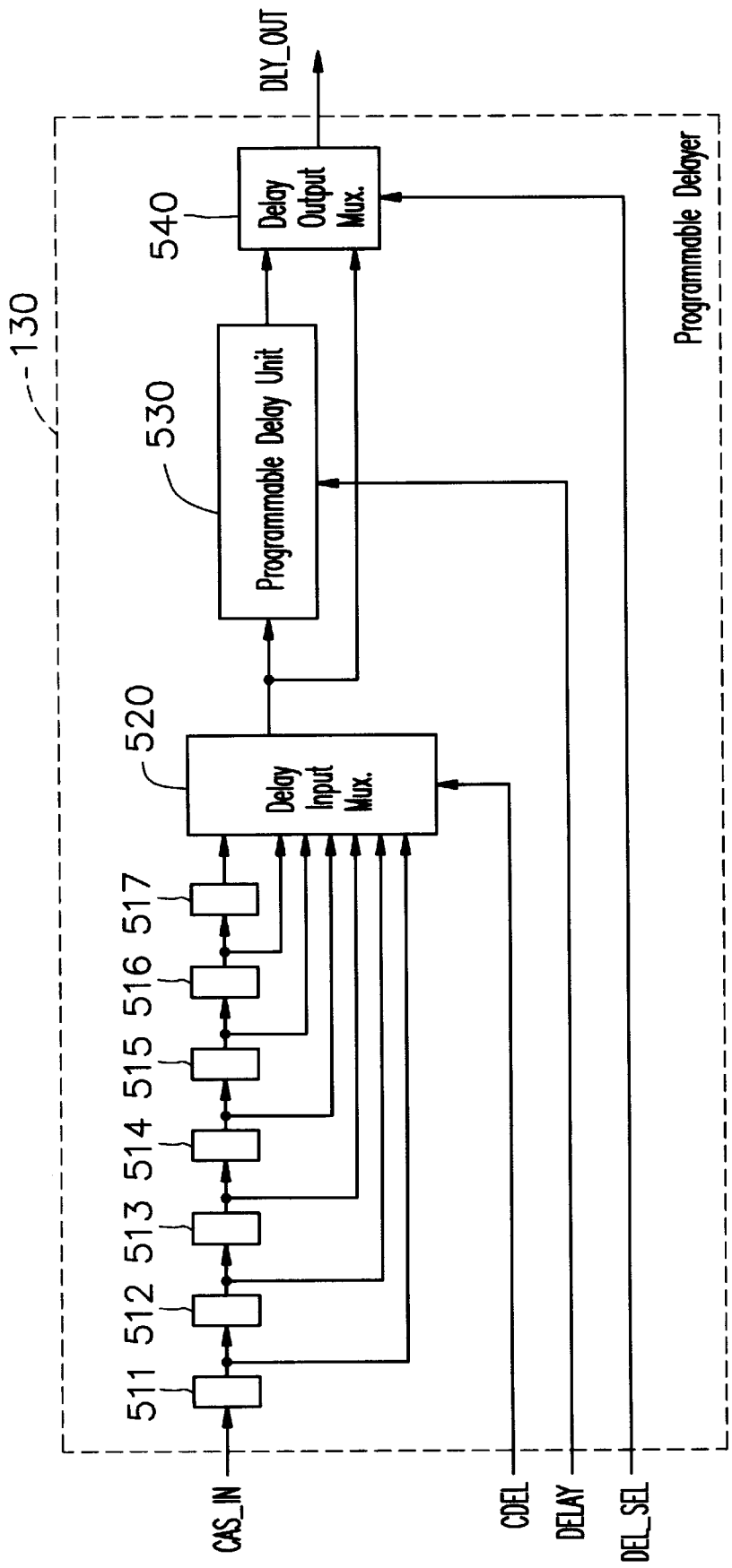
FIG. 5 is a block diagram schematically illustrating the programmable delay line of the RSP chip.

The function of the programmable delay line 130 is to provide data for a concurrent alignment, such as a comparison between two windows in a constant false alarm rate (CFAR) operation. FIG. 5 is a block diagram schematically illustrating the programmable delay line of the RSP chip. Referring to FIG. 1 and FIG. 5, the programmable delay line 130 includes several delay latches 511–517, a delay input multiplexer 520, a programmable delay unit 530, and a delay output multiplexed 540. The delay latches 511–517 are serially coupled together, in which each of the delay latches 511–517 also transmits an output to the delay input multiplexer 520. The first delay latch 511 has an input from the cascade input CAS_IN. For every clock cycle, the data stored in the delay latch is shifted to the next delay latch. The delay input multiplexer 520 receives the transmits of the delay latches 511–517 and transmits an output to the programmable delay unit 530 and the delay output multiplexer 540. A delay input control strobe CDEL controls the delay input multiplexer 520 to determine its output, which is from one of the delay latches 511–517. A delay presetting strobe DELAY controls the programmable delay unit 530 to set the delay time. The delay time can range from 1 to its maximum delay capability of clock cycles, such as 64 clock cycles. For example, for a programmable delay unit 530 with a maximum delay capability of 64 clock cycles, if the delay presetting strobe DELAY is 31 then the programmable delay unit 530 transmits its result after a delay of 32 clock cycles. The delay output multiplexer 540 includes two inputs and thereby receives the outputs from the programmable delay unit 530 and the delay input multiplexer 520. The delay output multiplexer 540 transmits a delay signal DLY_OUT. A delay output strobe DEL_SEL controls the delay output multiplexer 540 to select on of its inputs for the delay signal DLY_OUT.

Figure 6:
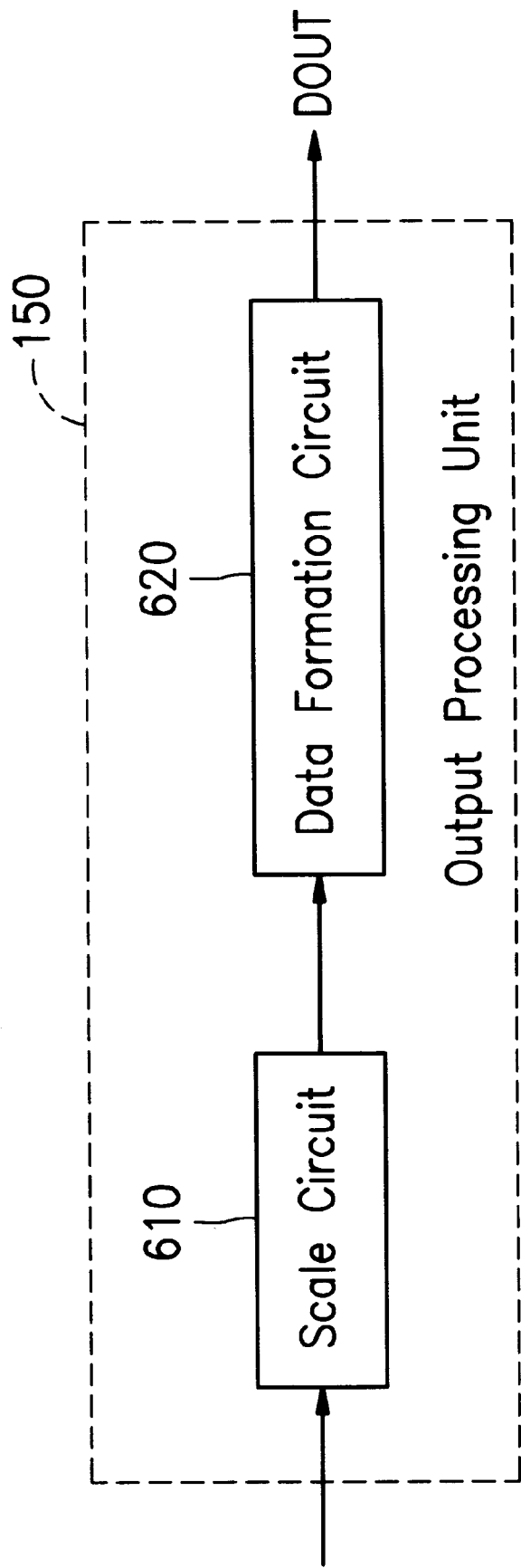
FIG. 6 is a block diagram schematically illustrating the output processing unit of the RSP chip.

In order to scale and format the arithmetic output of the ALU 140, in which the arithmetic is indirectly from the MAC array 120, the RSP chip 100 also includes the output processing unit 150 for this purpose. The details are shown in FIG. 6, which is a block diagram schematically illustrating the output processing unit 150 of the RSP chip 100. The output processing unit 150 includes a scale circuit 610 and a data formation circuit 620. The scale circuit 610 can scale down the arithmetic result to fit the integral word length. The data formation circuit 620 converts the data outputting from the scale circuit 610 into a desired format, and then transmits to the data output DOUT, which is the data output DAT_OUT of the RSP chip 100. The desired format, for example, can be a floating-point number.

Figure 7:
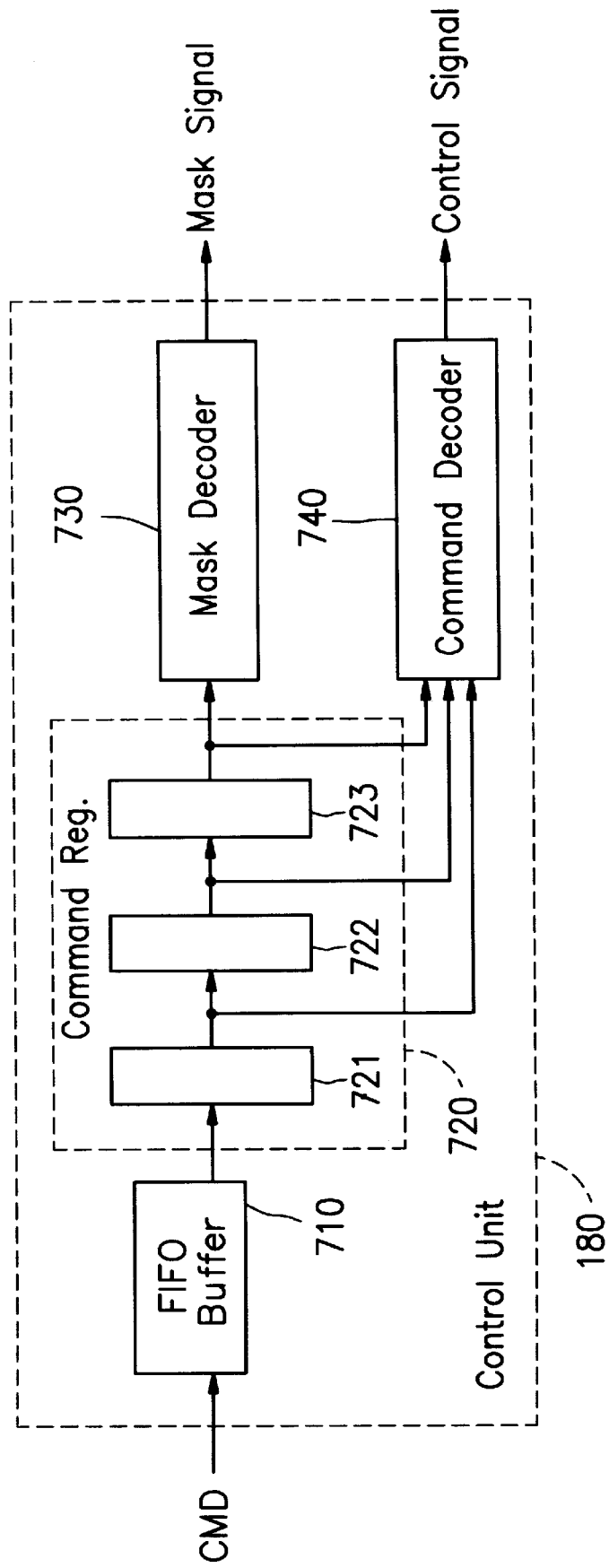
FIG. 7 is a block diagram schematically illustrating the control unit of the RSP chip.

The control unit 180 is shown in details in FIG. 7, which is a block diagram schematically illustrating the control unit 180 of the RSP chip 100. The control unit 180 receives a control command CMD and decodes the control command CMD into a number of mask signals and control signals. The mask signals control the reference select multiplexer 230 as indicated as MASK input in FIG. 2 to enable or disable the reference select multiplexer 230 and then accordingly enable or disable the MAC unit 300. Therefore, the used number of the MAC units 300 can be determined. The control signals generally control the operation of the RSP chip 100 on other units. The control unit 180 includes a first-in-first-out (FIFO) buffer 710, a command register 720, a mask decoder 730, and a command decoder 740. The FIFO buffer 710 receives and temporarily keeps the desired control commands CMD, and transmits an internal command to the command register 720. The command register 720 is composed of several command latches such as three latches 721, 722, and 723, to store a complete set of the control command CMD. If each latch can store 12 bits then the command register 720 with three latches have 36 bits for storing the control command CMD. The control command CMD is inputted to the RSP chip 100 with three times, in which 12 bits are sent in each time. After the control command CMD is registered in the command register 720, the control command CMD through the command register 720 is then sent to the mask decoder 730 and the command decoder 740 to be decoded as the mask signals and the control signals. The number of mask signals depends on the number of MAC units 300 in the MAC array 120. For example, if the MAC array 120 includes 64 MAC units 300 then it needs 64 mask signals. Each of mask signals enables or disables its corresponding MAC unit 300. In this case the 64 mask signals occupy 6 bits in the control command CMD. The mask decoder 730 receives the last latch 723 output in the command register 720. The command decoder 740 receives three transmits of the latches 721, 722 and 723 to decode into the input select strobe INSW, the output select strobe COSEL, the reference select strobe R_SEL the delay input control strobe CDEL, the delay presetting strobe DELAY, and the delay output strobe DE_SEL. These control strobes are used to control the elements of the RSP chip 100 and set the delay parameters.

Figure 8:
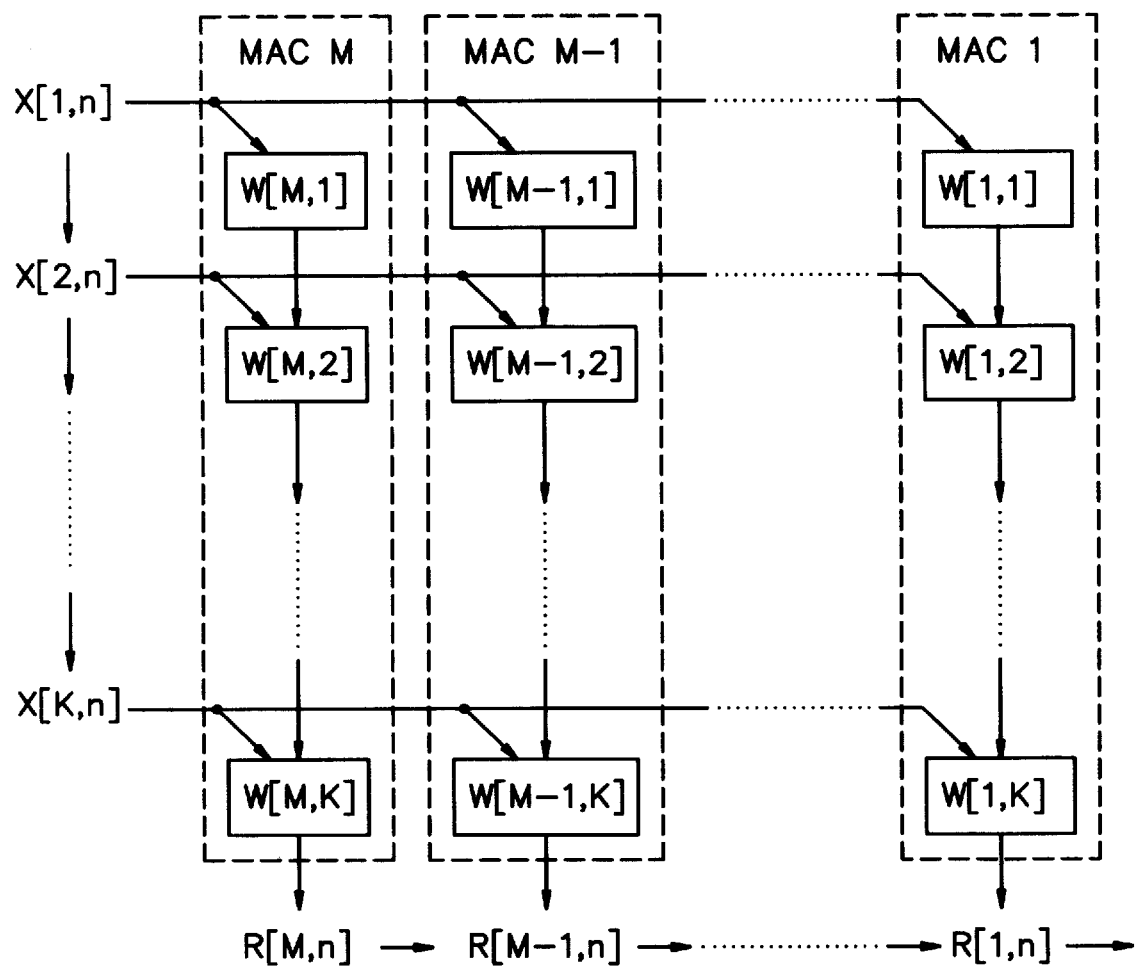
FIG. 8 is a flow block diagram schematically illustrating a matrix product operation, according to the invention.

When the RSP chip 100 performs a digital Fourier transformation (DFT) computation, the DFT computation can be expressed as a matrix product:

$$R[m, n] = \sum_{k=1}^{k=K} W[m, k] \cdot X[k, n],$$

where m=1,2,3 . . . , M and n=1,2,3 . . . , N. When M is less or equal to the number of MAC units 300, the matrix multiplication can be completely done in a single RSP chip 100. A vector of {W[m, 1], W[m, 2], . . . , W[m, K]} is the $m^{th}$ row of the coefficient matrix W stored in the $m^{th}$ RCG unit 200 at the look-up table circuit 220. The matrix W contains several base functions with different phase periods used in frequency domain, such as W[m,k]=$e^{-jmk\pi/p}$, where p is a parameter representing the emitted pulse number used in the pulse Doppler processing. A vector of {X[1, n], X[2, n], . . . , X[K, n]} is the $n^{th}$ column of the matrix X, which is, column by column, inputted from the data input DAT__IN. After the $n^{th}$ column is inputted, a vector of {R[1, n], R[2, n]. . . , R[M, n]} is the $n^{th}$ column of the matrix R after product. The number of total columns is N. This R column vector is the computation result and can be shifted out one by one from the MAC array 120. FIG. 8 is a space-time diagram schematically illustrating a matrix product operation, according to the invention. In FIG. 8, each element of the R column vector is a summation result of each MAC unit 300.

If the M index of the matrix is larger than the number of MAC units 300 of a RSP chip 100 the computation can be done either by cascading a number of RSP chips 100 or by folding over procedure in a single RSP chip 100.

Figure 9:
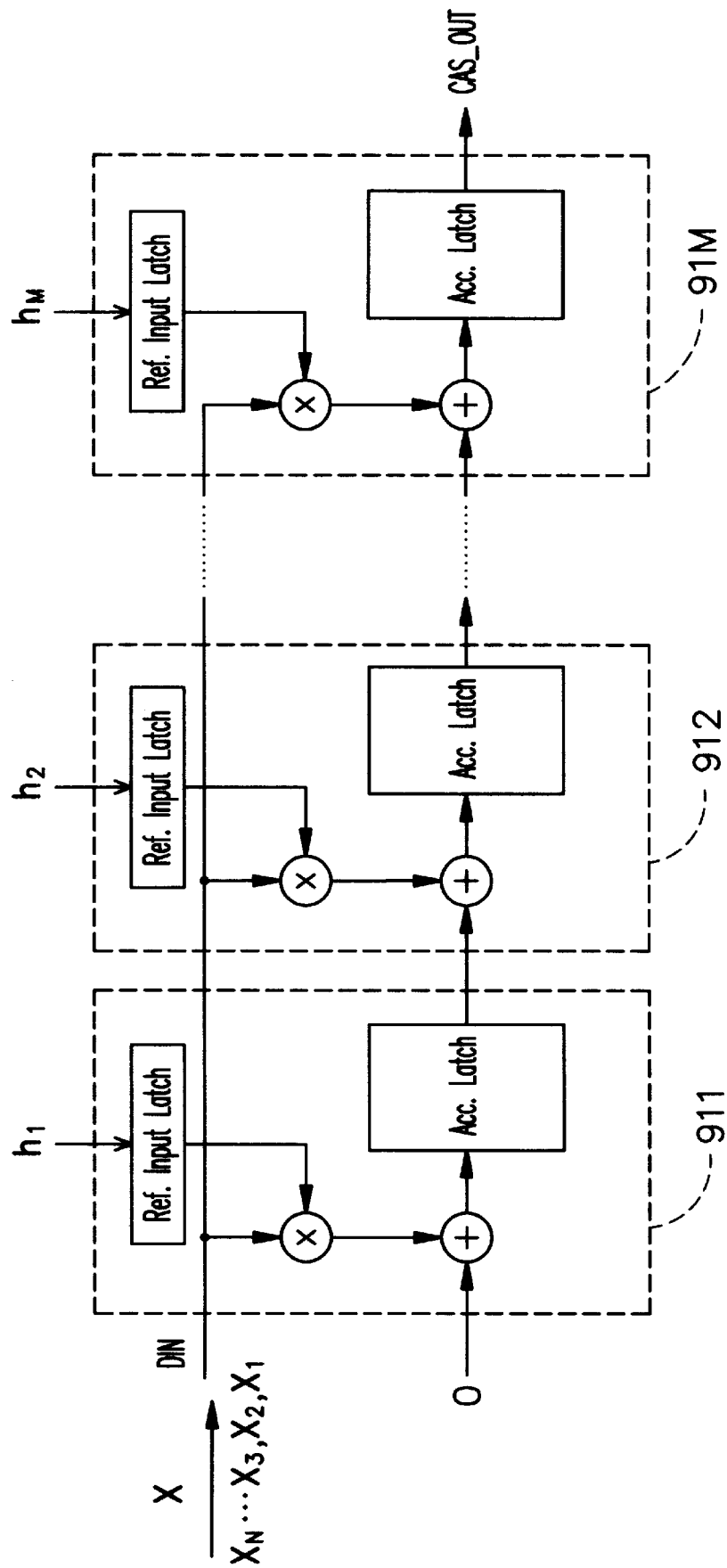
FIG. 9 is a correlation operation configuration schematically illustrating the data correlation operation in the invention.
Figure 10:
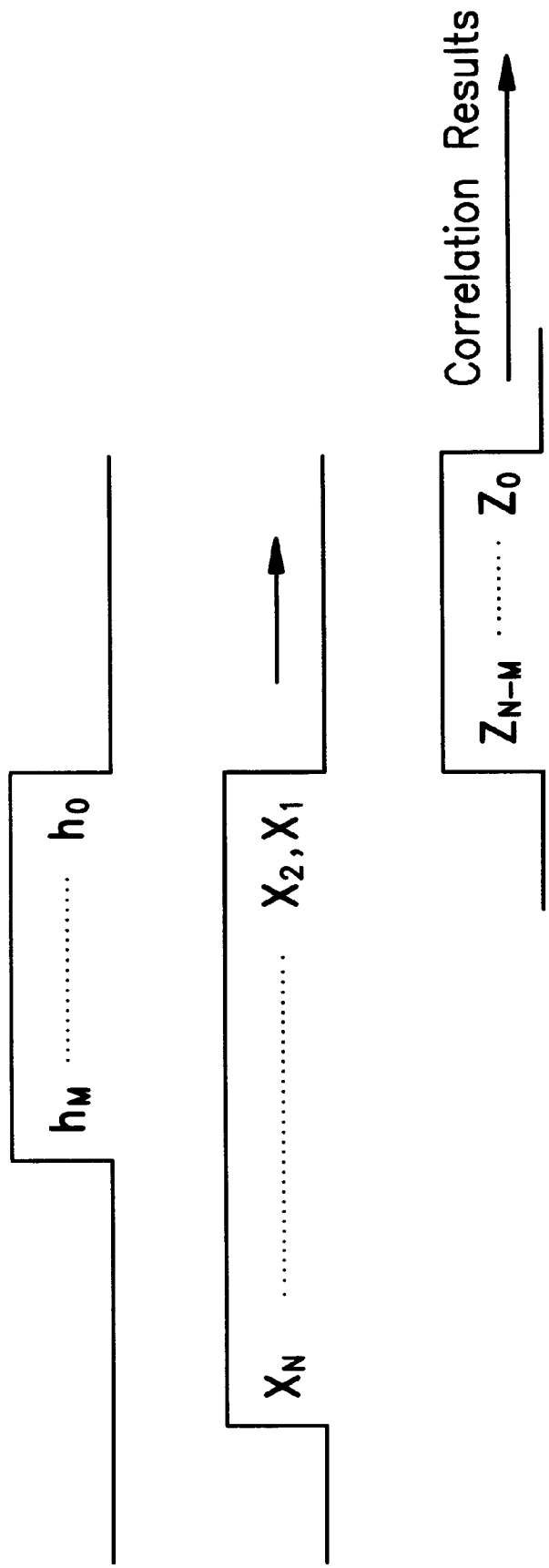
FIG. 10 is a schematic drawing illustrating a correlation computation in the invention.
Figure 11:
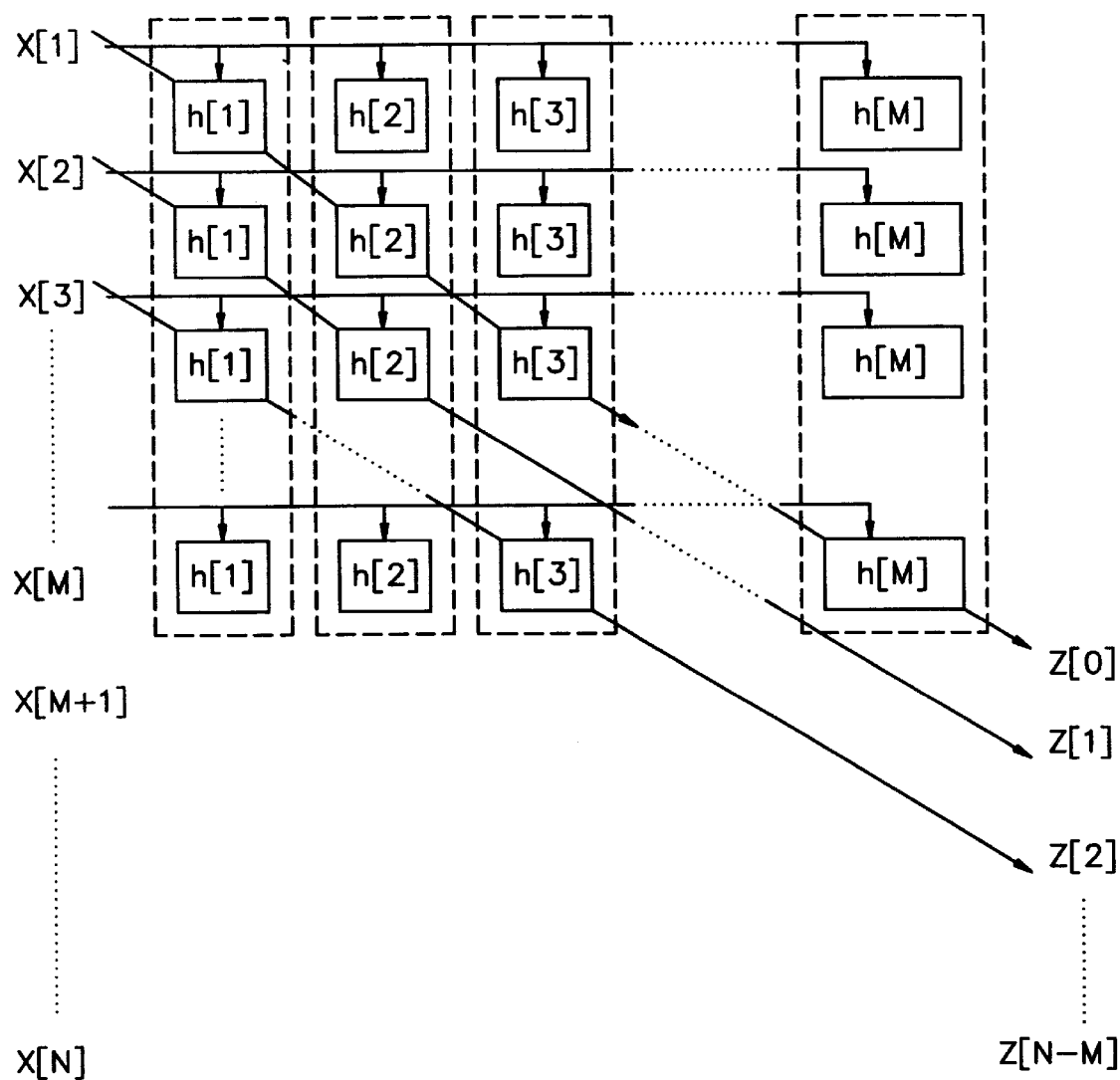
FIG. 11 is a space-time diagram schematically illustrating the data flow in the correlation operation.

The RSP chip 100 described above performs a correlation computation for pulse compression. A computation relation is expressed as $$z(k) = \sum_{i=1}^{i=M} h(i) \cdot x(k + i),$$

where k=0,1,2 , . . . , N-M. The RSP chip is set at the pipeline operation mode as shown in FIG. 9, which is a correlation operation configuration schematically illustrating the data correlation operation in the invention. Referring to FIG. 1, FIG. 3, and FIG. 9, in the pipeline operation mode, the accumulation latch 370 output COUT__1 of the previous MAC unit 300 is connected to the current unit at the adder 360 input CIN__1 through the cascade select multiplexer 350. In FIG. 9, a number of dashed blocks 911, 912, . . . , 91M represent the MAC units, respectively. FIG. 10 a schematic drawing illustrating a correlation computation in the invention. The arrow direction is time flow direction. The elements of a vector h(i) are sequentially inputted to the RSP chip 100 at the REF__IN and then inputted to the reference latch 210 of the RCG unit 200 at RIN. When the computation starts, the elements of a vector x(k+i) are sequentially inputted to the MAC array 120 at the data input DAT__IN. After M computation cycles, a first element of the computation results z(0) is obtained, in which M is the element number of the vector h(i). FIG. 11 is a space-time diagram schematically illustrating the data flow in the arithmetic operation. In FIG. 11 the MAC array processes the correlation computation in the pipeline operation mode. Referring to FIG. 9 and FIG. 11, before the computation starts, the elements of the vector h(i) have been sent to each MAC unit 300 and all computation results in the MAC units 300 are set to zero. For the first cycle of computation, the data input DAT__IN sends in x(1) to multiply all elements of the vector h(i). The results are stored at each accumulation latch 370 in the MAC units 300. For the second computation cycle, x(2) is sent in to multiply all the elements of the vector h(i). The computation results in each MAC unit 300 are accumulated. For example, at the second computation cycle, The first MAC unit 300 obtains a result of x(2)·h(1) and the second MAC unit 300 obtains a result of x(1)·h(1)+x(2)·h (2). After the third computation cycle, the first MAC unit 300 obtains a result of x(3)·h(1), the second MAC unit 300) obtains a result of x(2)·h(1)+x(3)·h(2), and the third MAC unit 300 obtains a result of x(1)·h(1)+x(2)·h(2)+x(3)·h(3). After the $M^{th}$ computation cycle, the first product element z(0) is obtained at the CAS__OUT. Then, the last element z(N-M) is obtained at the $N^{th}$ computation cycle.

Figure 12:
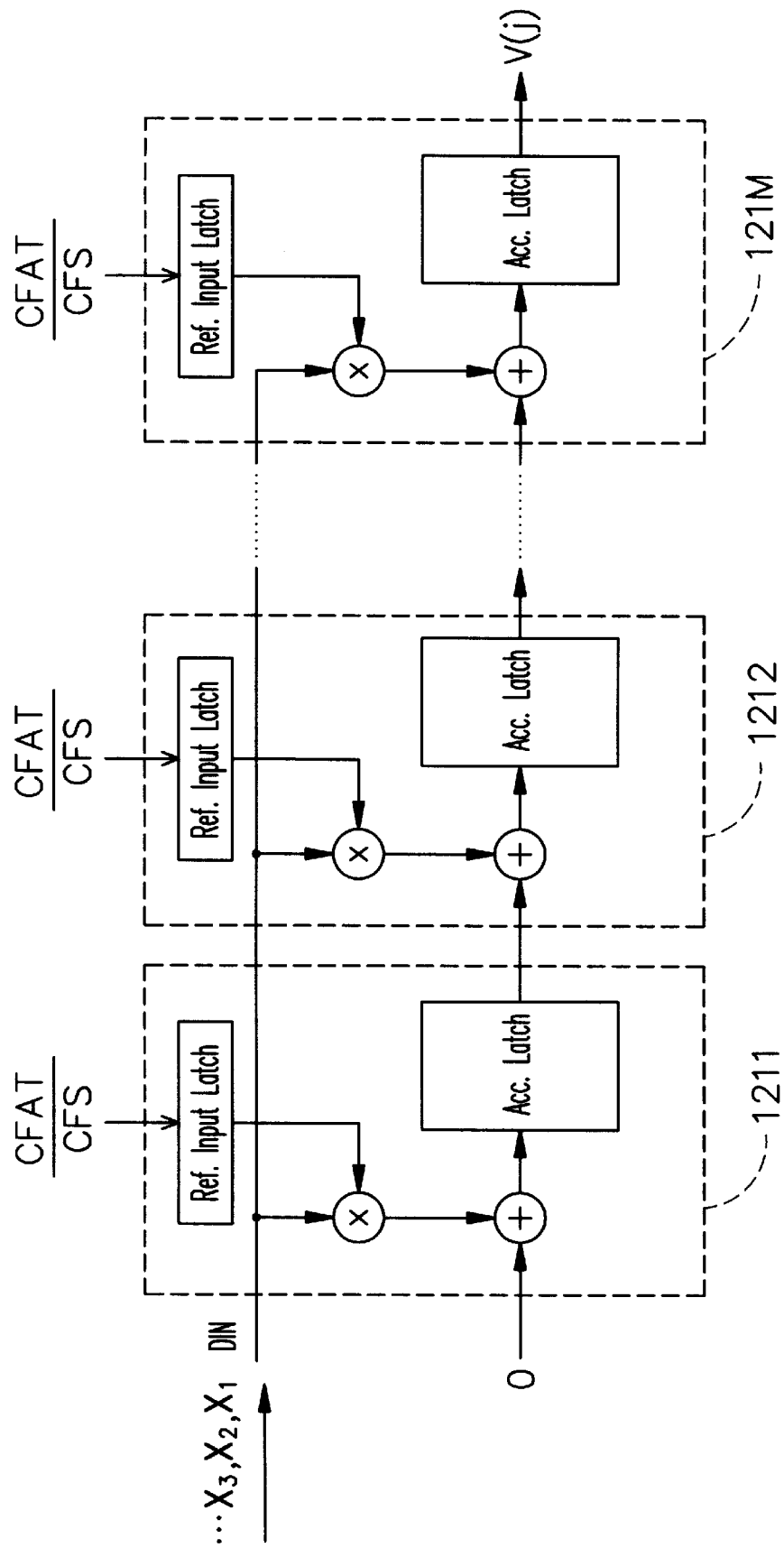
FIG. 12 is an operation configuration schematically illustrating the CFAR operation in the invention.
Figure 13:
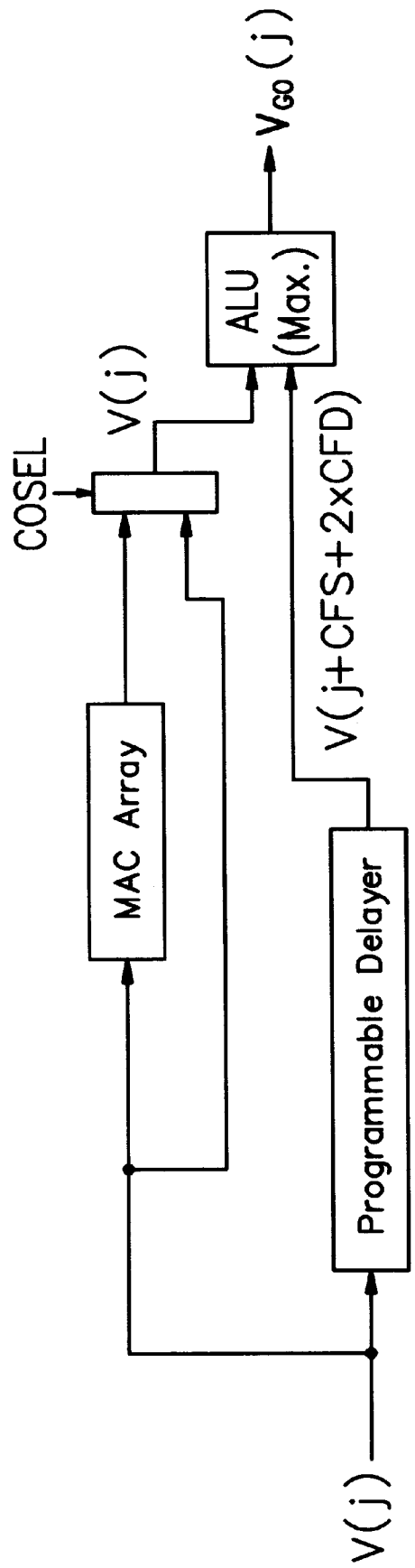
FIG. 13 is a block diagram schematically illustrating the GO_CFAR threshold operation.
Figure 14:
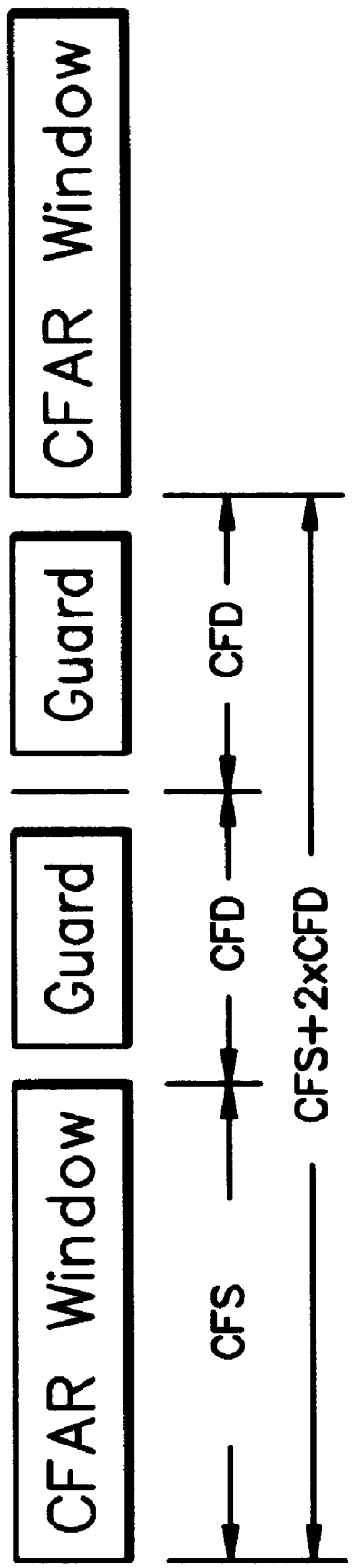
FIG. 14 is a CFAR space diagram schematically illustrating a delay presetting of the GO_CFAR threshold operation.

Another application of the RSP chip 100 is detecting the greatest of constant false alarm rate (GO__CFAR) in the radar operation. The detecting threshold can be obtained by following computation relation:

$$V_{GO} = MAX[V(j), V(j+CFS+2 \cdot CFD)]$$

$$V(j) = \frac{CFAT}{CFS} \cdot \sum_{i=0}^{i=CFS-1} x(i + j)$$

where j=. . . , N-CFS+1, x(i) is the input data, CFS is the size of a CFAR window, CFAT is the CFAR scale factor, and the CFD is the length of guard cells. The cell average value of a CFAR window can be obtained through the MAC array 120 computation. The quantities of two CFAR windows can be compared each other by setting the delay time of the programmable delay line 130. So, the GO__CFAR can be obtained. FIG. 12 is an operation flow diagram schematically illustrating the CFAR operation in the invention. The cell average value V(j) can be obtained from the MAC array 120 as shown in FIG. 12. The V(j) computation for CFAR window is done in one RSP chip. Another RSP chip can do the GO__CFAR operation. FIG. 13 is a block diagram schematically illustrating the GO__CFAR detecting operation. The V(j) from the MAC array 120 is inputted to another RSP chip at the programmable delay line and the MAC array. In FIG. 13, the ALU is set to an operation mode for obtaining the maximum quantity. If the number of data in the CFAR window is over the number of MAC units in one RSP chip, two or more RSP chips can be serially coupled. FIG. 14 is a block diagram schematically illustrating a delay presetting of the GO__CFAR detecting operation. The delay time is set by including two guard cells and one CFAR window. The time width of the guard cell is CFD. The data number of the CFAR window is CFS. Therefore, the total delay time is CFS+2·CFD.

The RSP chip can also work with an external memory device to achieve a recursive computation. By the various computation properties of the ALU 140, the RSP chip can operate a product computation of a vector and a matrix. For example, a computation relation is expressed as $$SUM(x) = \sum_{n=1}^{M} C(n) \cdot Y(n, x),$$

x=0,1,2, . . .L-1.
The MAC array can be set in a pipeline operation mode as shown in FIG. 9. The C(n) is inputted into the MAC array to be a number of reference data REF__DAT, which are h values in FIG. 9. The elements of the Y(n, x) array are sequentially inputted from the DAT. The summation sequence for each recurrent summation is $SUM_1(x)=C(1)\cdot Y(1, x)$, $SUM_2(x)=C(2)\cdot Y(2, x)+SUM_1(x)$, . . . , $SUM_M(x)=C(M)\cdot Y(M, x)+SUM_{M-1}(x)$.

A radar includes several operation modes such as a moving target indicator (MTI), a digital video integrator (DVI) with range walk compensation, a maximum threshold computation, a target detection, and even a nonlinear wave envelope computation, which includes square and square root computations and can be simplified to have a linear asymptotic expression:

$$\sqrt{I^2+Q^2} \cong 0.9604\cdot\text{Max}(|I|, |Q|) + 0.3978\cdot\text{Min}(|I|, |Q|).$$

All above operation modes can be operated to obtain the desired data by the RSP chip 100 through the design of the ALU 140 and the MAC array 120.

As the above descriptions the RSP chip in the invention can perform the parallel or the pipeline computations with high efficiency of multiply and accumulate (MAC) operation. So, the RSP chip can process massive data with complicated computations in real time, such as most of radar signal operations: the pule compression, the pulse Doppler processing, the moving-target indication, the digital video integration, the constant false alarm rate detection, and so on.

Figure 15:
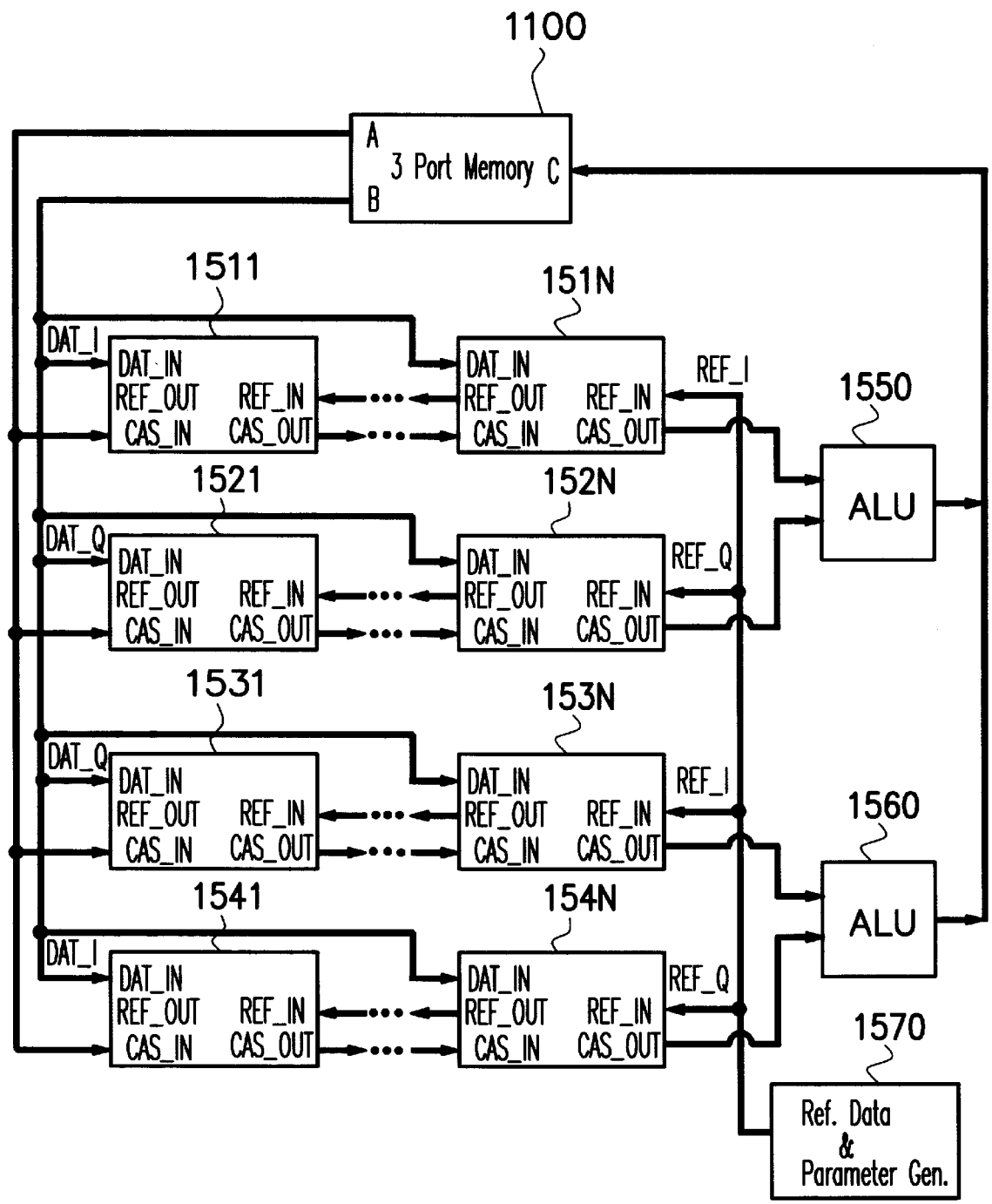
FIG. 15 is an operation configuration schematically illustrating a connection of multiple RSP chip array for a complex number.
Figure 16:
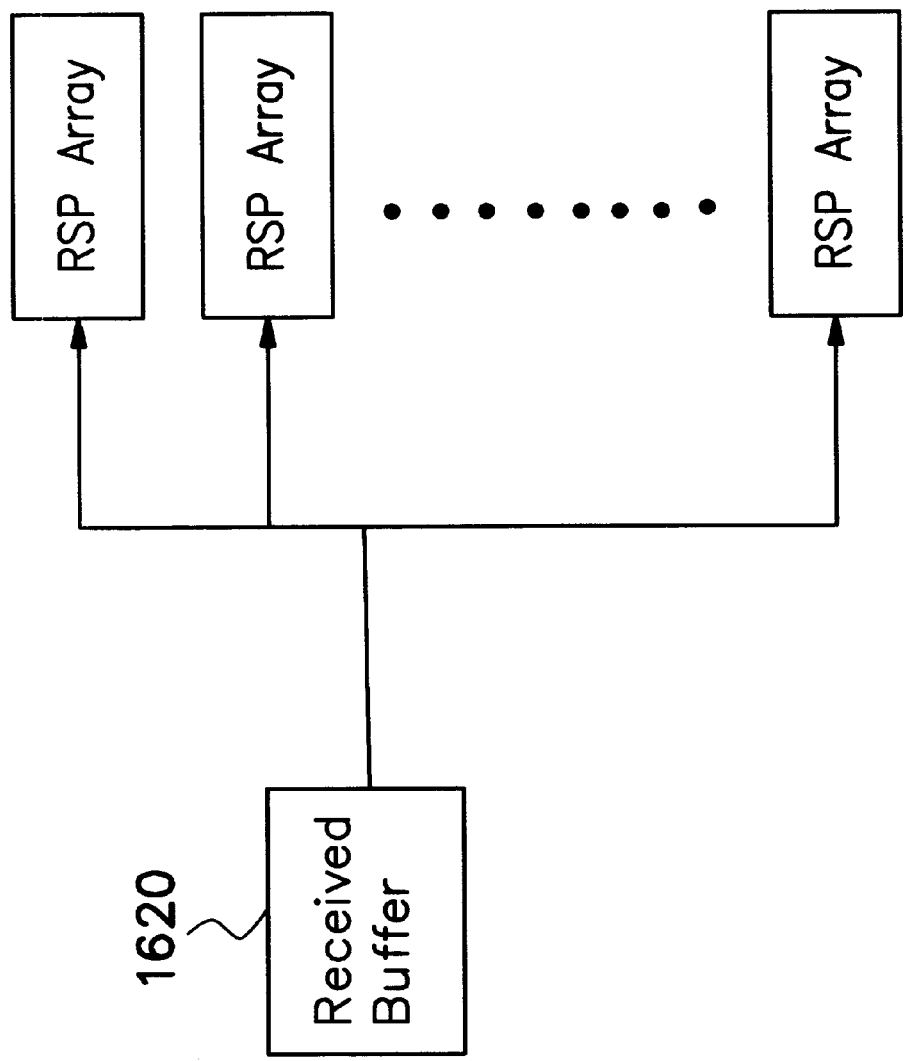
FIG. 16 is a block diagram schematically illustrating the multiple RSP chip array parallel processing flow for the pulse Doppler radar.

The number of MAC units 300 and the processing data format in a RSP chip 100 depends on what the current VLSI technology can accommodate. If the system requirement is greater than what a chip can afford, this RSP chip 100 supports cascade and concurrent data alignment for multiple chips architecture. For example, FIG. 15 is an operation configuration schematically illustrating a connection of a RSP array for processing a complex number. In FIG. 15, each block 1511, 151N, . . . , 1541,154N represents one RSP chip 100. DAT_I is the real part of a complex number, and DAT_Q is the imaginary part of the complex number. Several multiple RSP chips with integer data format can implement a system for complex data processing and can be cascaded to provide enough number of MAC units 300. The purpose of the operation configuration shown in FIG. 15 is for correlation pulse compression. If the number of MAC units 300 required by the system is greater than that a RSP chip 100 can provide, multiple RSP chips can be configured as shown in FIG. 15 and another manner shown in FIG. 16. FIG. 16 is, for example, a block diagram schematically illustrating the multiple RSP chip array parallel processing flow for the pulse Doppler radar. These operations shown in FIG. 15 and FIG. 16 can also be folded over in a single RSP chip.

In conclusion, the RSP chip in the invention has several characteristics as follows:

1. The RSP chip includes the MAC array 120 with several MAC units 300 and the programmable delayer 130. The programmable delayer 130 is for the concurrence data alignment. The MAC array 120 can be set to operate either the parallel operation mode or the pipeline operation mode. Moreover, the RSP chip also includes the look-up table circuit 220 in the RCG un it 200 to store the data table of a mathematical function such as sine and cosine functions, which are massively used for DFT computation in most radar operations.

2. The RSP chip can be fabricated with the VLSI technology to include all elements for the data processing. The RSP chip can be serially coupled one after another so that the RSP chip can process, in real time, a massive data with complicated computations.

The invention has been described using an exemplary preferred embodiment. However, it is to be understood that the scope of the invention is not limited to the disclosed embodiment. On the contrary, it is intended to cover various modifications and similar arrangements. The scope of the claims therefore should be accorded the broadest interpretation so as to encompass all such modifications and similar arrangements.

What is claimed is:

1. A radar signal processing (RSP) chip, which receives a data input, a reference input, and a cascade input, and transmits a data output, a reference output, the RSP chip comprising:

a reference code generator (RCG) to receive the reference input and to transmit a reference code vector, wherein the RCG further comprises a plurality of RCG units, each of which receives an internal reference input and transmits an internal reference output and an internal reference value, and the RCG units are serially coupled together through their internal reference inputs and their internal reference transmits but the internal reference input of the first RCG unit receives the reference input of the RSP chip, and the internal reference output of the last RCG unit transmits the reference output of the RSP chip;

a programmable delayer to receive the cascade input and to transmit a delay signal;

an input select multiplexer to receive the data input the cascade input, and a feedback input, and to transmit an input multiplexer signal;

a multiply and accumulate (MAC) array to receive the input multiplexer signal and the cascade input, and to transmit a computation result via the first output port and a second output port, wherein the MAC array further comprises a plurality of MAC units, each of which receives the internal reference value, the output multiplexer signal, a first internal cascade input, and a second internal cascade input, and transmits a first internal cascade output and a second internal cascade output, and the MAC units are serially coupled together, in which the first internal cascade output of the previous MAC unit is sent to the first internal cascade input of the current MAC unit, and the second internal cascade output of the previous MAC unit is sent to the second internal cascade input of the current MAC unit, but the first internal cascade input and the second internal cascade input of the first MAC unit receive a zero constant, the first internal cascade output of the last MAC unit transmits the first output port, and the second internal cascade output of the last MAC unit transmits the second output port;

an output select multiplexer to receive the first output port, the second output port, and the input multiplexer signal, and to transmit an output multiplexer signal;

an arithmetic and logical unit (ALU) to receive the output multiplexer signal and the delay signal, and to transmit an arithmetic output, which is sent to the feedback input of the input select multiplexer;

an output processing unit to receive the arithmetic output and to transmit the data output, wherein the output processing unit further comprises a scale circuit and a data formation circuit, in which the scale circuit receives the arithmetic output and transmits a scale circuit output signal to the data formation circuit, which then transmits the data output; and a control unit to receive a control command and output a plurality of mask signals and control signals, in which the control unit comprises a first-in-first-out (FIFO) buffer, a command registers a mask decoder, and a command decoder.

2. The RSP chip of claim 1, wherein each of the RCG units comprises a reference latch, a look-up table circuit, and a reference select multiplexer, in which the reference latch receives the internal reference input and transmits the internal reference output, the look-up table circuit receives the internal reference output and transmits a look-up table circuit output, and the reference select multiplexer receives the internal reference output and the look-up table circuit output and transmits the internal reference value.

3. The RSP chip of claim 2, wherein each of the MAC units comprises a reference input latch, a multiplier, an adder, a cascade select multiplexer, an accumulation latch, a download select multiplexer, and a download latch, in which the reference input latch receives the internal reference value from one of the RCG units, the multiplier receives a reference input latch output and the data input, the adder receives a cascade select multiplexer output and the multiplier output, the accumulation latch receives an adder output and transmits the first internal cascade output, the cascade select multiplexer receives the first internal cascade input and the first internal cascade output and transmits the cascade select multiplexer output, the download select multiplexer receives the first internal cascade output and the second internal cascade input, and the download latch receives an download select multiplexer output and transmits the second internal cascade output.

4. The RSP chip of claim 3, wherein the RCG units and the MAC units are respectively paired, in which each pair is coupled through the internal reference value transmitted from the paired RCG unit to the paired MAC unit.

5. The RSP chip of claim 4, wherein the programmable delayer comprises a plurality of delay latches, a delay input multiplexer, a programmable delay unit, and a delay output multiplexer, all of which are sequentially coupled together, in which the delay latches, each of which includes a delay latch input and a delay latch output, of the programmable delayer are serially coupled together but the first delay latch receives the cascade input of the RSP chip, the delay input multiplexer receives the each delay latch output of the delay latches and transmits an internal delay input signal, the programmable delay unit receives the internal delay input signal and transmits an internal delay signal, and the delay output multiplexer receives the internal delay signal and the internal delay input signal and transmits the delay signal.

6. The RSP chip of claim 5, wherein the FIFO buffer receives the control command and transmits an internal command to the command register.

7. The RSP chip of claim 6, wherein the command register receives the internal command and transmits a plurality of temporary commands.

8. The RSP chip of claim 7, wherein the command register comprises a plurality of command latches, which respectively output the temporary commands, being serially coupled together but the first command latch receives the internal command.

9. The RSP chip of claim 8, wherein the mask decoder receives the last temporary command from the last command latch and transmits the mask signals.

10. The RSP chip of claim 9, wherein each of the mask signals controls one of the RCG units at the reference select multiplexer, in which when the mask signal is at enabling voltage level, the internal reference value in each RCG unit is zero so as to determine the number of MAC units to be used.

11. The RSP chip of claim 10, wherein the command decoder receives the temporary commands and transmits the control signals.

12. The RSP chip of claim 11, wherein the control signals include an input select strobe, an output select strobe, a reference select strobe, a mode control strobe, a delay input control strobe, a delay presetting strobe, a delay output strobe.

13. The RSP chip of claim 12, wherein the input select strobe controls the input select multiplexer to determine that the input multiplexer signal transmitted from the input select multiplexer is one of the data input, the cascade input, or the feedback input.

14. The RSP chip of claim 13, wherein the output select strobe controls the output select multiplexer to determine that the output multiplexer signal transmitted from the output select multiplexer is one of the first output port, the second output port, or the input multiplexer signal direct from the input select multiplexer.

15. The RSP chip of claim 14, wherein the reference select strobe controls the reference select multiplexer in one of the RCG units to determine that the internal reference value is one of the internal reference output from the reference latch or the look-up table circuit output.

16. The RSP chip of claim 15, wherein the mode control strobe controls the cascade select multiplexer to determine that the cascade select multiplexer output is one of the first internal cascade input or the first internal cascade output.

17. The RSP chip of claim 16, wherein a download control strobe is comprised to control the download select multiplexer in one of the MAC units to determine that the download select multiplexer output is one of the second internal cascade input or the first internal cascade output.

18. The RSP chip of claim 17, wherein the delay input control strobe controls the delay input multiplexer in the programmable delayer to determine that a delay input multiplexer input is one of the delay latch transmits.

19. The RSP chip of claim 18, wherein the delay presetting strobe determines a delay time of the programmable delay unit in the programmable delayer.

20. The RSP chip of claim 19, wherein the delay output strobe controls the delay output multiplexer in the programmable delayer to determine that a delay output multiplexer output is one of the internal delay signal from the programmable delay unit or the internal delay input signal from the delay input multiplexer.

* * * * *